Feb. 1, 1966 C. F. QUATE 3,233,183

PARAMETRIC AMPLIFIER USING AN ACOUSTICAL WAVE TO PASSIVELY COUPLE TWO ELECTROMAGNETIC WAVES HAVING DIFFERENT VELOCITIES OF PROPAGATION

Filed Sept. 6, 1962 4 Sheets-Sheet 1

CALVIN F. QUATE
INVENTOR.

BY Flehr and Swain
ATTORNEYS

CALVIN F. QUATE
*INVENTOR.*

BY
Flehr and Swain
ATTORNEYS

CALVIN F. QUATE
*INVENTOR.*

BY
Flehr and Swain
ATTORNEYS

PARAMETRIC AMPLIFIER USING AN ACOUSTICAL WAVE TO PASSIVELY COUPLE TWO ELECTROMAGNETIC WAVES HAVING DIFFERENT VELOCITIES OF PROPAGATION

Filed Sept. 6, 1962 4 Sheets-Sheet 4

CALVIN F. QUATE
*INVENTOR.*

BY

Flehr and Swain
ATTORNEYS 3,233,183
Patented Feb. 1, 1966

3,233,183

PARAMETRIC AMPLIFIER USING AN ACOUSTICAL WAVE TO PASSIVELY COUPLE TWO ELECTROMAGNETIC WAVES HAVING DIFFERENT VELOCITIES OF PROPAGATION

Calvin F. Quate, 1175 Richardson Ave., Los Altos, Calif.

Filed Sept. 6, 1962, Ser. No. 221,705
11 Claims. (Cl. 330—5)

This invention relates generally to a parametric device and method.

It is known that carriers drifting through a piezoelectric crystal under the influence of an applied electric field interact with the electric fields set up by the acoustic wave travelling in the piezoelectric crystal. There is strong interaction when the drift velocity of the carriers is somewhat greater than the acoustic wave velocity. The electric fields are generated within the piezoelectric crystal due to the deformation of the crystal by the acoustic wave as it travels therethrough. In turn, the carriers interact with the travelling acoustic wave electric fields. The interaction of the carriers and the acoustic wave electric fields provides a mechanism for amplifying the acoustic wave at the expense of power in the carrier drift current.

The mechanism is analogous to the interaction between the electromagnetic waves on the electron beam and the electromagnetic waves supported by the slow wave structure in travelling wave devices such as travelling wave amplifiers and oscillators.

By appropriately selecting the dimensions of the piezoelectric crystal and the magnitude of the drift field, it is possible to set up and maintain acoustic oscillations within the crystal.

In theory, the interaction can take place at very high frequencies to give gain at these frequencies. Thus, if high frequency electromagnetic waves could be converted into acoustic waves, and conversely acoustic waves could be converted back into electromagnetic waves, the foregoing principle of acoustic amplification could be employed to amplify electromagnetic energy. However, due to the enormous difference between the velocity of light (electromagnetic waves) and the velocity of sound (acoustic waves), it is difficult to convert from one type of wave to the other.

In recent years, considerable work has been done on parametric amplifiers, oscillators and frequency converters. One class of such devices is the distributed or travelling wave type device. In this type of device, an electromagnetic pump wave is propagated along a transmission line which also carries the electromagnetic signal wave. An electromagnetic idler wave is generated by the interaction of the pump wave and the signal wave. The pump wave serves to couple the idler wave and the signal wave and provides the power for amplifying the signal wave.

The coupled mode equations which govern the parametric amplifier and oscillator are:

$$\omega_P = \omega_S + \omega_I$$
$$\beta_P = \beta_S + \beta_I$$

where $\omega_P$=frequency of pump wave
$\omega_S$=frequency of signal wave
$\omega_I$=frequency of idler wave
$\beta_P$=pump wave propagation constant
$\beta_S$=signal wave propagation constant
$\beta_I$=idler wave propagation constant When the same structure carries all of the waves and the velocities of the waves are equal, the equations are redundant. The pump frequency, for active coupling, is the sum of the idler and signal frequency. In operation then, there is frequency conversion from the signal and pump frequency to the idler frequency. The energy of the pump frequency and the idler frequency is in the same form, electromagnetic energy.

If, for example, it is desired to amplify a 3000 mc. signal and the structure can propagate a 3500 mc. idler frequency, the pump frequency must be 6500 mc. The main drawback of this type of device is apparent. The pump frequency must be relatively high. Generators capable of generating relatively high frequency are difficult to construct.

Where the pump frequency is less than the signal frequency, $\omega_P = \omega_S - \omega_I$, there is passive coupling and the device does not amplify. It may, however, serve as a frequency converter converting the signal frequency to the idler frequency.

It is a general object of the present invention to provide a parametric device and method employing acoustic wave coupling.

It is another object of the present invention to provide a parametric device in which an acoustic wave travelling in a crystal couples electromagnetic waves on a stream of carriers drifting through the crystal with another electromagnetic wave.

It is a further object of the present invention to provide a parametric device and method in which an acoustic wave passively couples two electromagnetic waves having different velocities of propagation.

It is another object of the present invention to provide a high frequency solid state amplifier and/or oscillator and method of operation.

It is another object of the present invention to provide a method and device for coupling electromagnetic energy to a carrier wave.

It is another object of the present invention to provide a parametric device and method employing velocity conversion of propagating waves.

It is another object of the present invention to provide an amplifier and oscillator which operates on energy from a D.-C. source much the same as travelling wave tubes, backward wave oscillators and klystrons rather than from energy from the modulating signal.

It is another object of the present invention to provide a parametric device and method in which a low frequency modulation wave provides passive coupling between a wave carried by drifting carriers and an electromagnetic wave.

The foregoing and other objects of the invention will become more clearly apparent from the following description when taken in conjunction with the accompanying drawings.

Referring to the drawings.

Figure 1:
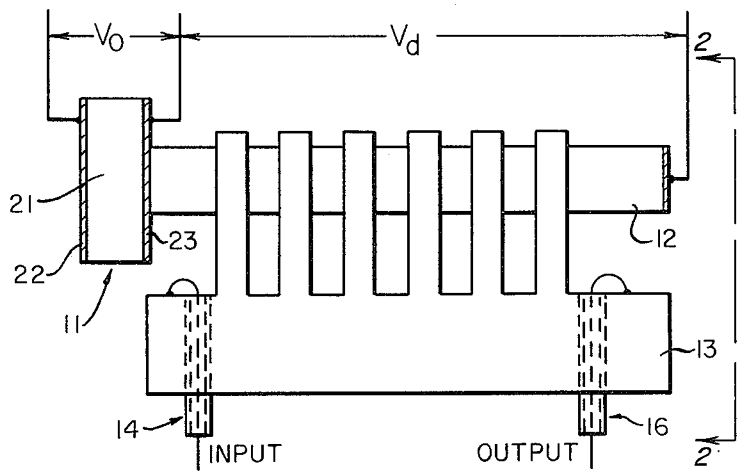
FIGURE 1 shows an amplifier utilizing parametric coupling, and frequency and velocity conversion.
Figure 5:
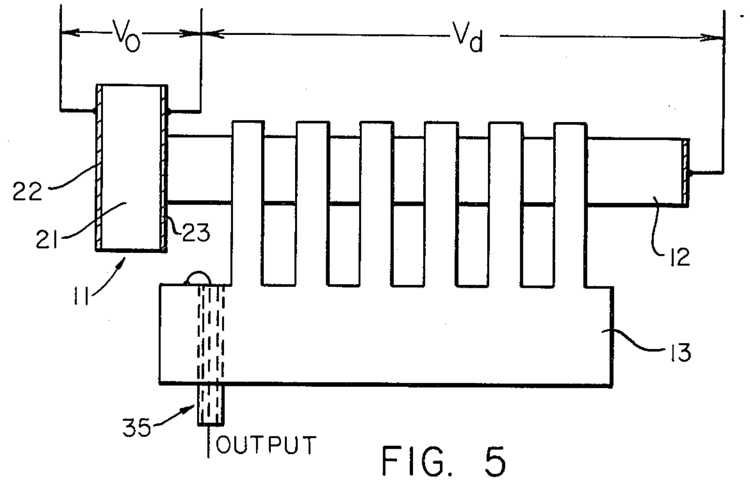
Figure 6:
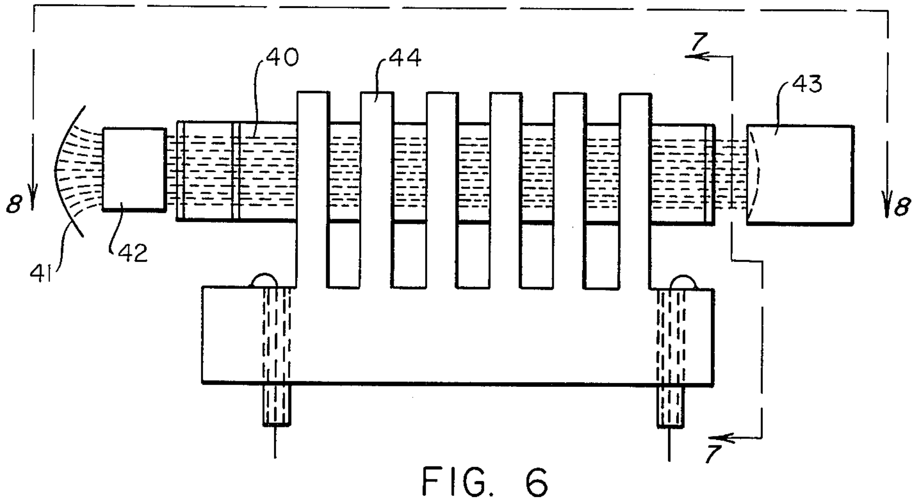
Figure 7:
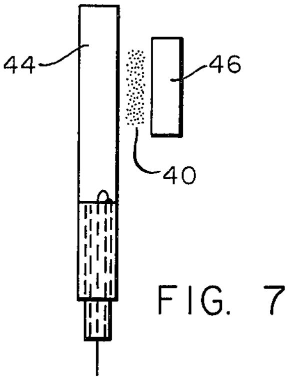
Figure 8:
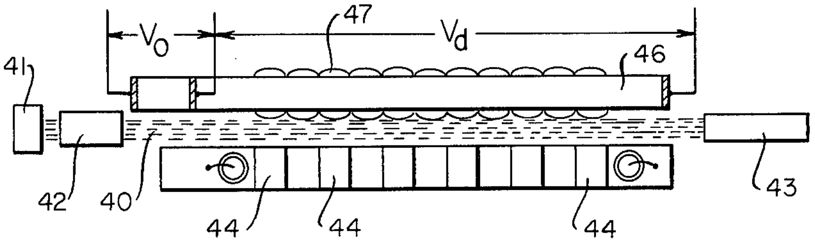
Figure 9:
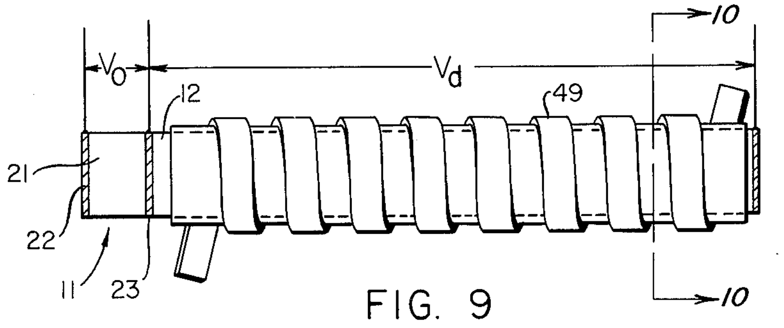
Figure 11:
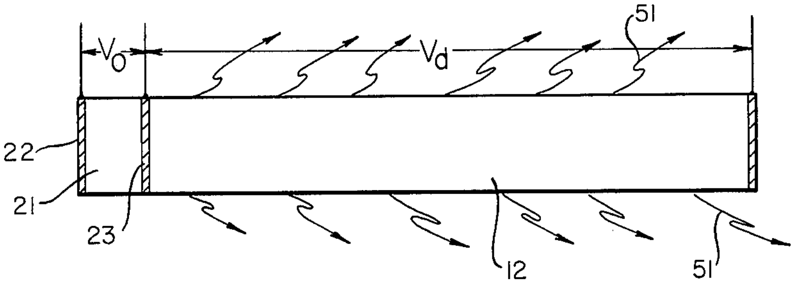
Figure 12:
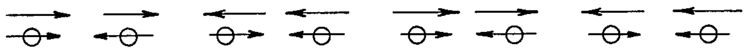
Figure 10:
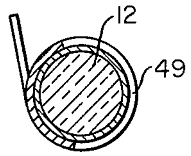
Figure 13:
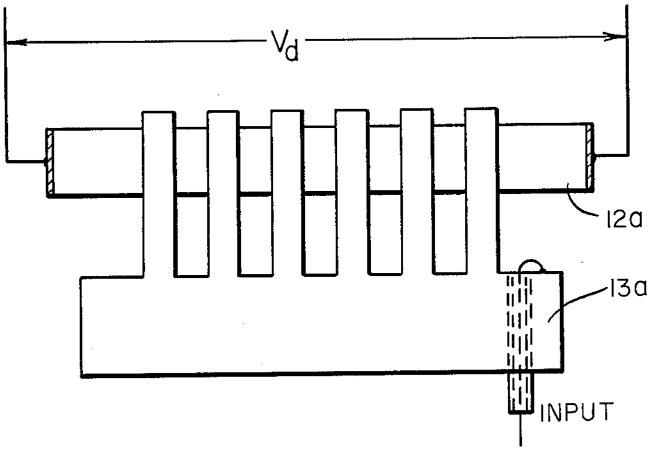
Figure 14:
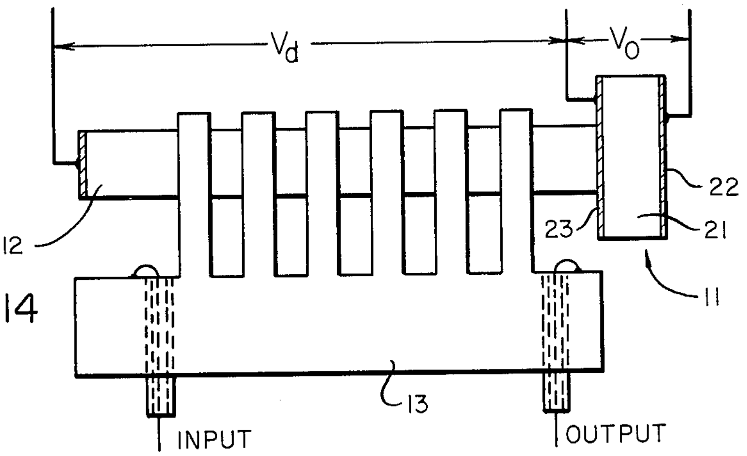
Figure 15:
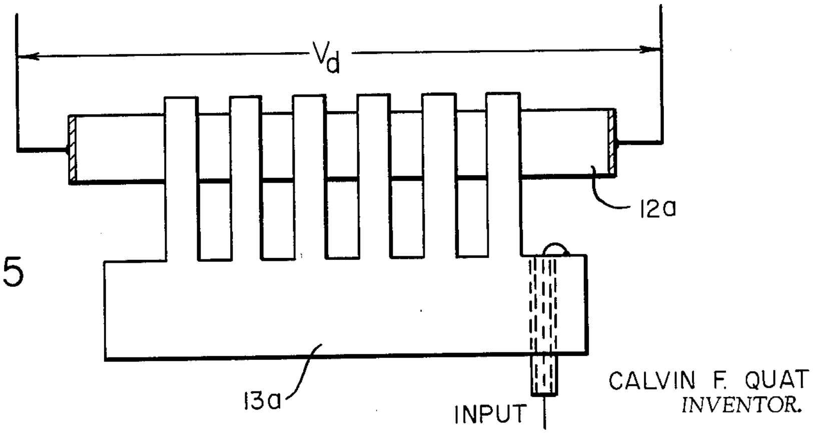

FIGURE 5 schematically illustrates an oscillator employing parametric coupling and velocity and frequency conversion;

FIGURES 6, 7 and 8 show another amplifier employing parametric coupling, and frequency and velocity conversion;

FIGURE 9 shows a device similar to that of FIGURE 1 employing a different slow wave structure for the electromagnetic waves;

FIGURE 10 is an end view of the device of FIGURE 9 taken generally along the line 10—10 of FIGURE 9;

FIGURE 11 shows an oscillator employing parametric coupling, and velocity and frequency conversion for generating very high frequencies;

FIGURE 12 schematically illustrates the operation of the device of FIGURE 11;

FIGURE 13 shows a device for converting electromagnetic waves to acoustic waves;

FIGURE 14 shows a device in which the signal wave has the highest frequency; and FIGURE 15 shows another device for converting electromagnetic waves to acoustic waves.

The parametric device and method of the present invention is based on the discovery that the three waves need not be electromagnetic and that the velocities can differ substantially, and yet the waves can be parametrically coupled.

The device of the present invention includes means for supporting an electromagnetic signal wave having a relatively high velocity, means for supporting an electromagnetic carrier wave having a much lower velocity in coupled relationship to the signal wave, and means for supporting a coupling or modulating wave in coupled relationship to the electromagnetic carrier wave. The various means for supporting the waves may be separate means, common means or combinations thereof.

In one embodiment of the invention, an acoustic wave is set up in a piezoelectric semiconductive crystal. The acoustic wave serves to compress and rarify the crystal. The compression and rarefaction gives rise to electric fields in the crystal which travel through the crystal at the velocity of the acoustic wave in the crystal. The frequency of the wave corresponds to the acoustic wave frequency.

Simultaneously, there is set up a D.-C. electric field across the crystal which causes carriers to drift through the crystal. In one embodiment of the invention, the D.-C. field has a component in the same direction as the direction of travel of the acoustic wave whereby the carriers drift in the same sense as the acoustic wave.

The carriers travel at a velocity which is higher than the velocity of the acoustic wave and are coupled to the electric fields of the acoustic wave whereby there is interaction to modulate the carriers in accordance therewith.

Additionally, means are provided for supporting a signal electromagnetic wave so that it also interacts with the drifting carrier wave. As a result of the interaction of the various waves at different velocities and frequencies, there is a transfer of energy.

With the direction of propagation of the three waves (the acoustic, the carrier electromagnetic wave and the signal electromagnetic wave) in the same sense, there is an interaction such that D.-C. energy is transferred from the D.-C. field to the drifting carriers and, in turn, to the electromagnetic wave to amplify the same.

In the following description, the acoustic wave is referred to as the modulating wave having a frequency $\omega_m$ and a propagation constant $\beta_m$, where $\beta_m$ equals $\omega_m$ divided by the velocity of propagation $v_m$. The carrier wave propagation constant is $\beta_e$ and the frequency $\omega_e$. The signal wave has a frequency $\omega_s$ and a propagation constant $\beta_s$.

When the velocity of the signal wave is higher with the velocity of the carrier wave, in turn, being higher than the velocity of the acoustic wave, the following coupled mode equations govern:

$$\omega_m=\omega_e-\omega_s \quad (1)$$

$$\beta_m=\beta_e-\beta_s \quad (2)$$

The interaction is then such that exponential growth of the signal takes place at the expense of D.-C. energy.

As described above, it is sometimes desirable to transfer energy from electromagnetic waves to carrier waves. If the piezoelectric crystal supports a carrier wave travelling in one direction and the electromagnetic signal wave is arranged to travel in an opposite sense, there will be transfer of energy from the signal wave to the carrier wave. The carrier waves can be coupled to the acoustic waves in a piezoelectric crystal and amplified in the manner described above. In this instance, the coupled mode equations which govern are:

$$\omega_m=\omega_e-\omega_s \quad (3)$$

$$\beta_m=\beta_e+\beta_s \quad (4)$$

It is to be noted that in the above two examples (Equations 1 and 3), the signal wave has a frequency which is less than the carrier wave frequency. In certain instances, it is desirable to provide the above types of coupling and operation wherein the signal wave has a frequency which is higher than the modulating wave and carrier wave.

If the acoustic wave travels in a direction which is opposite to the direction of the carrier wave and the signal wave travels in the same direction as the carrier wave, then the following coupled mode equations govern:

$$\omega_m=\omega_s-\omega_e \quad (5)$$

$$\beta_m=\beta_e-\beta_s \quad (6)$$

If energy is to be transferred from the electromagnetic wave into the structure, then the following equations will govern:

$$\omega_m=\omega_s-\omega_e \quad (7)$$

$$\beta_m=\beta_e+\beta_s \quad (8)$$

In Equations 1 and 2, and 5 and 6, there is a transfer of energy from the D.-C. beam to the signal wave. In one instance, the signal wave is at a frequency which is less than the frequency of the carrier wave (intermediate frequency), while in the other instance, the signal wave is at a frequency greater than the carrier wave (highest frequency). In each instance, there is exponential growth of the signal. In the other instances, Equations 3 and 4, and 7 and 8, where energy is transferred from the signal waves to the carrier waves, the transfer of energy is sinusoidal. As is well known, energy is transferred back and forth between the waves when the coupling distance is several wavelengths long.

It is observed that in all instances there is provided first and second electromagnetic waves having greatly differing velocities of propagation which are coupled by a low frequency wave such as an acoustic wave. It is, also, to be observed relations 1 through 8 can be satisfied for $\omega_m=0$ and $\beta_m\neq0$. This would correspond to a zero frequency modulating wave travelling at zero velocity. It would be represented by a periodic spatial variation of the properties of the crystal which contain the drifting carriers.

Figures 2, 3, 4:
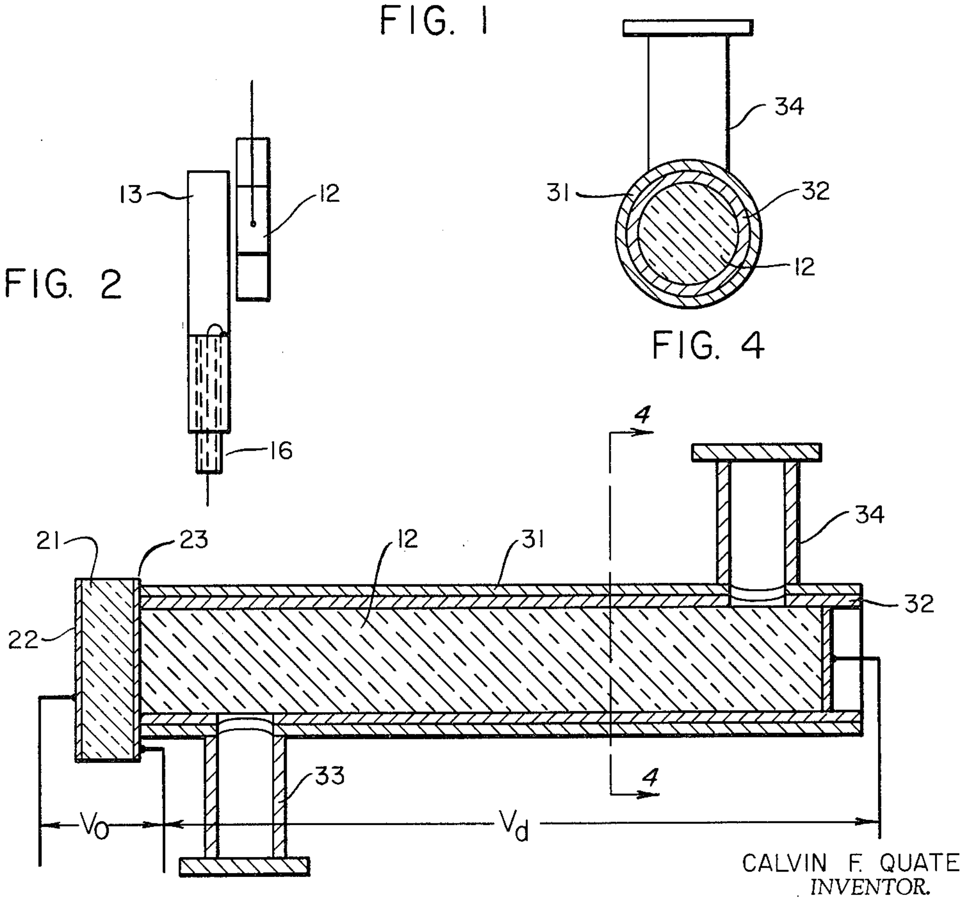
FIGURE 2 is an end view of the amplifier of FIGURE 1 taken along the line 2—2 of FIGURE 1.
FIGURE 3 shows another amplifier employing velocity conversion.
FIGURE 4 is a sectional view of the amplifier of FIGURE 3 taken along the line 4—4 of FIGURE 3.

Referring to FIGURES 1 and 2, there is shown an amplifier incorporating the present invention. The device includes an acoustic wave generator 11, an acoustic and carrier wave supporting crystal 12, and an electromagnetic slow wave structure 13 disposed so that the fields of the electromagnetic wave are coupled to the fields of the carrier wave.

Electromagnetic signals to be amplified are introduced at the input 14 of the slow wave structure, travel along the structure where they continuously interact with the carrier wave and arrive amplified at the output 16. The slow wave structure shown consists of a plurality of upwardly extending spaced fingers which support the electromagnetic waves with a velocity of propagation in the longitudinal direction dependent upon the spacing of the elements and considerably less than the free space velocity. Slow wave structures of this type and others are well known in the art and will, therefore, not be described in detail herein. Suffice to say that by appropriately selecting the type of structure and the physical dimensions, the desired phase velocity can be obtained.

The acoustic wave generator 11 comprises a piezoelectric semiconductive crystal 21 having conductive coatings 22 and 23 on opposite faces of the same. A voltage $V_0$ is applied between the faces by connecting a voltage source across the conductive coatings. This gives an electric field along the crystal. Carriers flow from one face to the other under the influence of the electric field.

When the electric field is applied across the crystal, acoustic waves are generated. Standing acoustic waves are set up within the crystal which have a frequency dependent upon the dimensions of the crystal. There is interaction between the drifting or flowing carriers and the acoustic wave fields, and the generator oscillates.

The acoustic generator transfers acoustic waves to the crystal 12 which is mechanically coupled thereto as, for example, by bonding the end of the same to the conductive element 23 as illustrated in the drawings. For maximum transfer of acoustic energy, the acoustic impedance of the crystal 21, conductive layer 23 and crystal 12 should be matched. For most efficient energy transfer, the acoustic layer should be relatively thin, in the order of a few microns. Other means may be provided for applying acoustic waves to the crystal 12 and the invention is not to be limited in this respect.

The acoustic wave then travels down the crystal 12 and sets up regions of compression and rarefication within the crystal. These deformations in the crystal give rise to electric fields which travel at the velocity of the acoustic wave and have the same frequency as the acoustic wave.

A voltage $V_d$ is applied longitudinally of the crystal so that it has a component in the same direction as the direction of travel of the acoustic waves in the crystal. The electric field causes carriers to drift from one end of the crystal to the other. It is apparent that these drifting carriers will be closely coupled to the electric fields within the crystals generated by the acoustic wave and are modulated thereby.

In accordance with one embodiment of the present invention, there is provided, adjacent to the crystal 12, a slow wave structure 13 which serves to support electromagnetic waves traveling at a velocity less than the free space velocity but substantially greater than the carrier wave velocity. The structure is arranged so that fields of the electromagnetic signal wave couple to the carrier wave fields to interact therewith. The input signal to be amplified is applied at one end of the slow wave structure and travels down through the structure to the output end. In its travel along the slow wave structure, the signal electromagnetic wave is coupled to the carrier wave and interacts therewith. D.-C. energy is transferred from the drifting carrier to the signal wave to amplify the signal wave, as previously described.

As a result of the combined interaction of the carrier wave with the electric fields of the acoustic wave and the electric fields of the electromagnetic waves, the carrier wave will have a carrier wave frequency higher than the electromagnetic and acoustic wave frequency. The relationship of the frequencies and propagation constants of the carrier wave, electromagnetic wave and acoustic wave is given above in Equations 1 and 2.

A typical example of velocities, frequencies, voltage, etc., for an amplifier which employs as the crystal the piezoelectric semiconductor $CdS$ is as follows: the acoustic energy travels at approximately $4\times10^5$ cm./sec. With a field of $18\times10^3$ volts/cm., the conduction electrons travel at approximately $5\times10^6$ cm./sec. The slow wave structure is selected whereby the velocity of the electromagnetic wave is $6\times10^8$ cm./sec. For such a structure, the frequency of the acoustic wave is 500 mc., while the carrier wave frequency is 3500 mc. and the frequency of the signal wave is 3000 mc.

Thus, it will be readily appreciated that the disadvantage of having to employ a high frequency pump inherent with parametric amplifiers is overcome in the present invention. D.-C. energy is extracted from the drifting carrier rather than from the pump wave. The modulating (pump) wave has low velocity and low frequency. The signal which is to be amplified is the intermediate frequency to which the slow structure must be designed. It is observed that since the velocity of the signal wave can be many times the velocity of the carrier wave, it is relatively easy to build a slow wave structure for operation at very high frequencies. This is in contrast with present day travelling wave tubes which require that the slow wave structure support the signal with a velocity substantially equal to the velocity of the electron beam.

Referring to FIGURES 3 and 4, there is shown another embodiment of the invention. In the embodiment of the invention shown in FIGURES 3 and 4, like reference numerals refer to like parts in FIGURES 1 and 2. In the embodiment shown in FIGURES 3 and 4, the crystal 12 is employed for supporting the acoustic wave and the carrier wave as in the embodiment described above. However, the crystal is also employed because of its high dielectric constant to slow down the electromagnetic wave travelling in the round waveguide 31. The crystal 12 is enclosed within a round waveguide structure 31 and electrically insulated therefrom by the sleeve 32 inserted between the waveguide walls and the crystal. The electromagnetic waves to be amplified are introduced at the input 33 and the amplified waves are available at the output 34. It is believed that the coupling between the electromagnetic wave and the carrier wave will be much more intense in the structure shown in FIGURES 3 and 4 because the waves are travelling within the same material.

Referring to FIGURE 5, there is shown a structure similar to that of FIGURE 1 in which there is provided an output 35 from the slow wave structure 13 at the acoustic generator end of the crystal 12. A device of this type with proper adjustment of the phase velocity of the various waves will have strong backward wave interaction and will oscillate. The frequency of the output waves will be determined by the structure as well as by the velocity of the carrier waves. The latter can be adjusted by varying the voltage $V_d$.

Referring to FIGURES 6, 7 and 8, there is shown another embodiment of the invention in which the carrier wave is supported on an electron stream 40 which is projected by an electron gun, schematically represented by the cathode 41 and focusing electrodes 42, and intercepted by the collector 43. The stream of electrons is arranged to travel closely adjacent the slow wave structure 44 as shown in FIGURE 7 and also closely adjacent the crystal 46. The electron stream is coupled to the electromagnetic wave on the slow wave structure and to the fringing fields 47 extending away from the crystal 46, as shown in FIGURE 8.

In FIGURES 9 and 10, there is shown another type of slow wave structure. The structure comprises a helically wound filamentary or ribbon-like conductor 49. As is well known, by appropriately choosing the diameter and pitch of the helix, the phase velocity of the electromagnetic wave supported by the helix can be accurately determined. The crystal 12, the acoustic wave generator and other components are substantially identical to those shown in FIGURE 1 and, therefore, have the same reference numbers.

The principle of operation of the present invention may be employed to generate electromagnetic waves in the optical mode.

Referring to FIGURE 11, there is schematically shown a parametric device for generating electromagnetic waves at infrared frequencies. Reference numerals similar to those used in the preceding figures are employed for the parts. Referring to FIGURE 12, a plurality of atoms forming the crystal lattice are illustrated. The arrows drawn above the atoms show how they oscillate in the acoustic mode (under the influence of the acoustic wave). It is well known that atoms may have many vibrational modes. Thus, the atoms also vibrate as indicated by arrows extending therethrough which indicates vibration in the optical mode. With sufficient amplification of the optical vibrations, electromagnetic waves in the infrared frequency will be radiated as indicated schematically by the arrows 51, FIGURE 11.

As previously described, electromagnetic energy can be transferred into the carrier waves. Referring to FIGURE 13, there is shown a crystal 12*a* having an applied voltage $V_d$. The voltage is selected to cause carriers to drift from left to right and as viewed in the figure. The drifting carriers are coupled to an electromagnetic wave travelling in the opposite direction on the slow wave structure 13*a*.

As previously described, the interaction serves to transfer energy from the electromagnetic wave to the carrier waves supported in the crystal 12. The acoustic wave will, in turn, be amplified by the interaction between it and the carriers in the manner described above.

FIGURE 14 schematically shows a device in which the signal frequency is the highest frequency. In this device, the acoustic wave is generated in the acoustic wave generator 11 and travels from right to left in the crystal 12 as viewed in FIGURE 14. A voltage $V_d$ is applied along the crystal 12 so that the carriers drift from right to left as viewed in the figure. The electromagnetic wave is supported on the slow wave structure 13 to travel from left to right as viewed in the figure. The electromagnetic wave is amplified by transfer of D.-C. energy from the carriers.

FIGURE 15 schematically illustrates operation of a device in the mode governed by Equations 7 and 8. The voltage $V_d$ causes carriers to drift from right to left as viewed in the figure, and the acoustic wave also travels from left to right as viewed in the figure. The input electromagnetic wave is applied to flow in from left to right. There is a transfer of energy from the electromagnetic wave to the carrier waves.

Thus, it is seen that there has been provided a parametic device and method in which a pair of electromagnetic waves having different velocities are coupled to each other through the medium of a slow wave, such as an acoustic wave, whereby there can be transfer of energy between the various waves. In the mode of operation which gives amplification or oscillation, D.-C. energy is transferred from the drifting carriers. In the other mode of operation, the enery is transferred from the electromagnetic wave to the carrier waves.

I claim:

1. A parametic device comprising means for supporting a first electromagnetic wave for travel along a predetermined path, said wave having a frequency $\omega_s$ and a propagation constant $\beta_s$, means for establishing a flow of carriers, said carriers being coupled to said first electromagnetic wave to be modulated thereby and serving to support a second electromagnetic wave having a frequency $\omega_e$, and a propagation constant $\beta_e$, and crystal means for supporting a third wave coupled to said carriers serving to independently modulate said carriers, said third wave having a frequency $\omega_m$ and a propagation constant $\beta_m$, the coupling between said waves being governed by the relationships $$\omega_m=(\omega_e-\omega_s)$$

and $$\beta_m=\beta_e\pm\beta_s$$

or $$\omega_m=(\omega_e-\omega_s)$$

and $$\beta_m=\beta_e\pm\beta_s$$

2. A parametic device as in claim 1 wherein said means for supporting said first wave comprises atoms in said crystal, said means for causing a flow of carriers comprises a drift field applied to said crystal to cause the carriers to flow therein and said means for independently modulating said carriers includes an acoustic wave generator for applying an acoustic wave to the crystal.

3. A parametic device as in claim 1 in which said carriers are caused to flow in the crystal by application of a drift field thereto, and in which said means for independently modulating the carriers comprises periodic spaced variations in the properties of said crystal.

4. A parametric device comprising a semiconductive piezoelectric crystal serving to support an acoustic wave, an acoustic wave generator coupled to said crystal for setting up acoustic waves in said crystal having a frequency $\omega_m$ and a propagation constant $\beta_m$ to interact with the crystal and set up electric fields therein, means for applying a voltage to said crystal to cause a drift of carriers within the crystal having a component of travel parallel to the direction of the acoustic wave, said carriers being coupled to the electric fields to be modulated by the electric fields and serving to support an electromagnetic wave having a frequency $\omega_e$ and a propagation constant $\beta_e$, and means for supporting another electromagnetic wave having a frequency $\omega_s$ and a propagation constant $\beta_s$, said last wave also being coupled to said carriers to modulate the same whereby there is a transfer of energy between the electromagnetic waves and the carriers, and the interaction between said waves is governed by the relationships $$\omega_m=(\omega_e-\omega_s)$$

and $$\beta_m=\beta_e\pm\beta_s$$

or $$\omega_m=-(\omega_e-\omega_s)$$

and $$\beta_m=\beta_e\pm\beta_s$$

5. A parametric device as in claim 4 wherein said means for supporting said another wave comprises a slow wave structure disposed closely adjacent to said crystal.

6. A parametric device comprising a semiconductive piezoelectric crystal, means for applying an acoustic wave to said crystal having a frequency $\omega_m$ and a propagating constant $\beta_m$, means for applying a voltage to said crystal to set up a stream of drifting carriers in a coupled relationship with said acoustic waves, and means for supporting a high velocity wave in coupled relationship to said carriers, said high velocity wave having a frequency $\omega_s$ and a propagation constant $\beta_e$, said carriers serving to support a carrier electromagnetic wave having a frequency $\omega_e$ and a propagation constant $\beta_e$, the interaction between said acoustic wave, said electromagnetic and said carrier electromagnetic wave being governed by the expressions:

$$\omega_m=(\omega_e-\omega_s)$$

and $$\beta_m=\beta_e\pm\beta_s$$

or $$\omega_m=-(\omega_e-\omega_s)$$

and $$\beta_m=\beta_e\pm\beta_s$$

7. A parametric device as in claim 6 wherein said means for supporting said high velocity wave comprises a waveguide structure in which the semiconductive piezoelectric crystal is disposed.

8. A parametric device as in claim 6 in which said means for supporting said high velocity wave comprises an inter-digitated structure disposed closely adjacent to the piezoelectric crystal.

9. A parametric device as in claim 6 in which said means for supporting the high velocity wave comprises a helical conductor disposed closely adjacent to the piezoelectric crystal.

10. A parametric amplifying device comprising means for supporting a first electromagnetic wave having a frequency $\omega_s$ and a propagation constant $\beta_s$, means for coupling a signal wave to said first named means, said signal wave having said frequency $\omega_s$ and said propagation constant $\beta_s$, means forming a stream of drifting carriers adapted to support a second electromagnetic wave having a frequency $\omega_e$ and a propagation constant $\beta_e$ with a lower velocity than said first electromagnetic wave, and a second frequency, said carriers being coupled to said first electromagnetic wave to be modulated thereby, a piezoelectric crystal, means for applying an acoustic wave energy to said piezoelectric crystal whereby acoustic electromagnetic waves are set up in the piezoelectric crystal to independently modulate the stream of drifting carriers, said acoustic electromagnetic waves having a frequency $\omega_m$ and a propagation constant $\beta_m$, said acoustic electromagnetic wave, first electromagnetic wave and second electromagnetic wave being coupled to one another with the coupling governed by the relationship:

$$\omega_m = (\omega_e - \omega_s)$$

and $$\beta_m = \beta_e \pm \beta_s$$

or $$\omega_m = -(\omega_e - \omega_s)$$

and $$\beta_m = \beta_e \pm \beta_s$$

11. A device as in claim 10 wherein said piezoelectric crystal is semiconductive and said means for causing drifting carriers comprises means for applying a longitudinal voltage to said semiconductive piezoelectric crystal.

References Cited by the Examiner

UNITED STATES PATENTS

| | | | |
|---|---|---|---|
| 2,760,013 | 8/1956 | Peter | 330—5 |
| 3,012,204 | 12/1961 | Dransfeld et al. | 330—5 |
| 3,119,074 | 1/1964 | Chang | 330—5 |

OTHER REFERENCES

White: 1962 International Solid-State Circuits Conference, pp. 28–29.

ROY LAKE, *Primary Examiner.*